United States Patent Office 2,898,385
Patented Aug. 4, 1959

2,898,385

PREPARATION OF 15,15'-DEHYDRO-β-CAROTENE

Otto Isler, Basel, Herbert Lindlar, Reinach, Basel-Land, Marc Montavon and Rudolf Rüegg, Basel, and Paul Zeller, Neuallschwil, Switzerland, assignors to Hoffmann-La Roche Inc., Nutley, N.J., a corporation of New Jersey No Drawing. Application December 9, 1955
Serial No. 551,984

Claims priority, application Switzerland
December 17, 1954

6 Claims. (Cl. 260—666)

This invention relates to an improved process for the preparation of 15,15'-dehydro-β-carotene, an important intermediate in the total synthesis of β-carotene. More particularly, the invention relates to such a process which is technically attractive for use in the commercial manufacture of β-carotene, and which results in a greater yield of 15,15'-dehydro-β-carotene than hitherto obtainable. (In the nomenclature "15,15'-dehydro-β-carotene," the numbers refer to the numbering of the carotene carbon skeleton shown in Liebig's Annalen der Chemie, volume 573, page 3 [1951].)

Briefly described, the invention relates to a process for the preparation of 15,15'-dehydro-β-carotene which comprises subjecting a compound selected from the group consisting of 1,18-di-(2,6,6-trimethyl-1-cyclohexen-1-yl)-3,7,12,16-tetramethyl-2,4,6,12,14,16-octadecahexaen-9-yne-8,11-diol and lower alkanoic acid diesters thereof and 1,18-di-(2,6,6-trimethyl-1-cyclohexylidene)-3,7,12,16-tetramethyl-2,4,6,12,14,16-octadecahexaen-9-yne-8,11-diol and lower alkanoic acid diesters thereof to allyl rearrangement-dehydration by the action of a hydrohalic acid.

In a preferred embodiment, the invention provides a process for the preparation of 15,15'-dehydro-β-carotene which comprises reacting 1,18-di-(2,6,6-trimethyl-1-cyclohexen-1-yl)-3,7,12,16-tetramethyl-2,4,6,12,14,16-octadecahexaen-9-yne-8,11-diol with a hydrohalic acid selected from the group consisting of hydrochloric acid and hydrobromic acid at a temperature below about 30° C. In a particularly preferred embodiment, anhydrous hydrogen chloride is employed as the reagent to effect the allyl rearrangement-dehydration.

In one comprehensive embodiment, the invention provides a process for the preparation of 15,15'-dehydro-β-carotene which comprises condensing acetylene with about two molar proportions of 8-(2,6,6-trimethyl-1-cyclohexen-1-yl)-2,6-dimethyl-2,4,6-octatrien-1-al in a di(lower alkyl) ether medium (preferably diethyl ether) and subjecting the resulting 1,18-di-(2,6,6-trimethyl-1-cyclohexen-1-yl)-3,7,12,16-tetramethyl-2,4,6,12,14,16-octadecahexaen-9-yne-8,11-diol, without isolation thereof but in the same ether medium in which produced, to allyl rearrangement-dehydration by mixing with an anhydrous hydrogen halide selected from the group consisting of hydrogen bromide and hydrogen chloride, preferably the latter.

In still another comprehensive embodiment, the invention provides a process for the preparation of 15,15'-dehydro-β-carotene which comprises making 1,18-di-(2,6,6-trimethyl-1-cyclohexen-1-yl)-3,7,12,16-tetramethyl-2,4,6,12,14,16-octadecahexaen-9-yne-8,11-diol as above, taking up said 1,18-di-(2,6,6-trimethyl-1-cyclohexen-1-yl)-3,7,12,16-tetramethyl-2,4,6,12,14,16-octadecahexaen-9-yne-8,11-diol in a lower alkyl alkanoate (such as methyl acetate or ethyl acetate, preferably the latter) and mixing the resulting solution with an anhydrous alcoholic (such as methanolic or ethanolic, preferably the latter) solution of a hydrogen halide (such as hydrogen bromide or hydrogen chloride, preferably the latter).

As indicated above, anhydrous hydrohalic acids are preferred as rearranging-dehydrating agents, particularly anhydrous hydrogen chloride or anhydrous hydrogen bromide; but concentrated aqueous hydrohalic acids may be employed if desired, e.g. commercial concentrated aqueous hydrochloric acid containing about 37% by weight of HCl or commercial concentrated aqueous hydrobromic acid containing about 48% by weight of HBr. In such case the 1,18-di(2,6,6-trimethyl-1-cyclohexen-1-yl)-3,7,12,16-tetramethyl-2,4,6,12,14,16-octadecahexaen-9-yne-8,11-diol is converted, by a bilateral allyl rearrangement reaction, to the corresponding 1,18-di-(2,6,6-trimethyl-1-cyclohexen-1-yl)-2,17-dichloro(or, respectively, dibromo)-3,7,12,16-tetramethyl-3,5,7,11,13,15-octadecahexaen-9-yne. Similarly, 1,18-di-(2,6,6-trimethyl-1-cyclohexylidene)-3,7,12,16-tetramethyl-2,4,6,12,14,16-octadecahexaen-9-yne-8,11-diol is converted, by a bilateral allyl rearrangement reaction, to 1,18-di-(1-chloro-[or bromo-]2,6,6-trimethyl-1-cyclohexyl)-3,7,12,16-tetramethyl-1,3,5,7,11,13,15,17-octadecaoctaen-9-yne. Each of these dihalo compounds is relatively unstable, and upon treatment with water loses two mols of hydrogen halide, thereby forming 15,15'-dehydro-β-carotene.

The conversion of the diols or their diesters to 15,15'-dehydro-β-carotene can be effected at elevated temperatures, if desired, but it is preferred to work at temperatures below about 30° C. In some modes of execution it may be desirable to use extensive cooling so as to operate below about 10° C. or even at zero or sub-zero temperatures.

It is preferred to dissolve the starting material in an inert organic solvent, such as diethyl ether, dioxane, methylene chloride, ethyl acetate and the like, before effecting the allyl rearrangement-dehydration reaction.

The invention is further disclosed in the following examples which are illustrative but not limitative thereof.

Example 1

26 g. of crude 1,18-di-(2,6,6-trimethyl-1-cyclohexen-1-yl)-3,7,12,16-tetramethyl-2,4,6,12,14,16-octadecahexaen-9-yne-8,11-diol (made by condensing 24 g. of 8-(2,6,6-trimethyl-1-cyclohexen-1-yl)-2,6-dimethyl-2,4,6-octatrien-1-al with acetylene dimagnesium bromide) was dissolved in 400 ml. of methylene chloride and cooled to minus 40° C. by solid carbon dioxide. 15 ml. of glacial acetic acid was added, whereupon the temperature rose to about minus 36° C. The reaction mixture was mixed within about 20 seconds with 16 ml. of concentrated aqueous hydrobromic acid containing 60% by weight of HBr. The mixture, containing 1,18-di-(2,6,6-trimethyl-1-cyclohexen-1-yl)2,17-dibromo-3,7,12,16-tetramethyl-3,5,7,11,13,15-octadecahexaen-9-yne, was stirred vigorously for 1½ minutes at minus 32° to minus 30° C. and was then reacted with 400 ml. of water having a temperature of 10° C. The mixture was stirred in an ice bath at 0° to minus 5° for one hour under a carbon dioxide atmosphere. The methylene chloride solution was then separated and washed thrice, each time with 100 ml. of water. The washed organic solution was concentrated, and the crystalline residue was extracted well with 75 ml. of petroleum ether (boiling range 30–50° C.). The mixture was filtered and the filtrate was washed with 50 ml. of petroleum ether. There was thus obtained 15.5 g. of 15,15'-dehydro-β-carotene. Upon recrystallization from methylene chloride-methanol, the compound had M.P. 154–155° C. and showed two maxima in the ultraviolet absorption spectrum, at 431 m$\mu$ ($\epsilon$=108000) and 457 m$\mu$ ($\epsilon$=88600) in petroleum ether.

Example 2

100 g. of 1,18-di-(2,6,6-trimethyl-1-cyclohexen-1-yl)-3,7,12,16 - tetramethyl-2,4,6,12,14,16-octadecahexaen-9-yne-8,11-diol (obtained according to Example 1) was acetylated in methylene chloride at 50° C. by reaction with acetyl chloride in the presence of pyridine. There was thus obtained 1,18-di-(2,6,6-trimethyl-1-cyclohexen-1-yl) - 3,7,12,16-tetramethyl-8,11-diacetoxy-2,4,6,12,14,16-octadecahexaen-9-yne, M.P. 107° C.

5 g. of the latter compound, dissolved in 50 ml. of diethyl ether, was refluxed for 4 hours with a mixture of 2.5 ml. of aqueous hydrochloric acid solution, containing 36% by weight HCl, and 25 ml. of ethanol. Even during the refluxing operation, 15,15'-dehydro-β-carotene started to precipitate in beautiful crystals. The crystallization was completed by allowing the reaction mixture, after refluxing, to stand at 0° C. There was obtained 3.3 g. of 15,15'-dehydro-β-carotene (83% of theory).

Example 3

26 g. of crude 1,18-di-(2,6,6-trimethyl-1-cyclohexen-1-yl) - 3,7,12,16-tetramethyl-2,4,6,12,14,16-octadecahexaen-9-yne-8,11-diol (made according to Example 1) was dissolved in 23 ml. of methylene chloride. 9 ml. of pyridine was added, and then 4 ml. of acetyl chloride in 4.5 ml. of methylene chloride was added dropwise while maintaining the temperature below 10° C. The mixture was stirred for one hour at 5° to 10° C. and one hour at 25° C. Then the reaction mixture was poured upon ice and the methylene chloride solution was washed twice with dilute aqueous hydrochloric acid and then once with water. The methylene chloride solution was diluted by the addition of further methylene chloride to a total volume of 400 ml., and then was treated with 16 ml. of aqueous HBr solution (60% by weight HBr) as in Example 1. There was thus obtained 15.5 g. of 15,15'-dehydro-β-carotene.

Example 4

A solution of crude 1,18-di-(2,6,6-trimethyl-1-cyclohexen-1-yl)-3,7,12,16-tetramethyl - 2,4,6,12,14,16-octadecahexaen-9-yne-8,11-diol in diethyl ether (obtained by condensation of 100 g. of 8-(2,6,6-trimethyl-1-cyclohexen-1-yl)-2,6-dimethyl-2,4,6-octatrien-1-al with acetylene dimagnesium bromide in diethyl ether) was diluted by the addition of further diethyl ether to a total volume of 700 ml. The reaction mixture was mixed at room temperature with 180 ml. of anhydrous ethanolic hydrogen chloride containing 8% by weight HCl, and was then allowed to stand for 5 hours, at a temperature gradually lowered from room temperature to 0° C., with occasional stirring. There was obtained 62 g. of 15,15'-dehydro-β-carotene (63% of theory calculated upon 8-(2,6,6-trimethyl-1-cyclohexen-1-yl)-2,6-dimethyl-2,4,6-octatrien-1-al).

Example 5

100 g. of 1,18-di-(2,6,6-trimethyl-1-cyclohexen-1-yl)-3,7,12,16 - tetramethyl - 2,4,6,12,14,16-octadecahexaen-9-yne-8,11-diol (obtained according to Example 1) was dissolved in 500 ml. of chloroform and mixed with a mixture of 60 ml. of ethanol and 32 ml. of aqueous hydrobromic acid containing 64% by weight HBr. The mixture was allowed to stand overnight. The 15,15'-dehydro-β-carotene which crystallized out was isolated by filtration and washing, as in Example 1.

Example 6

5 g. of 1,18-di-(2,6,6-trimethyl-1-cyclohexen-1-yl)-3,7,12,16 - tetramethyl-2,4,6,12,14,16-octadecahexaen-9-yne-8,11-diol (obtained according to Example 1) was refluxed for 2½ hours with 100 ml. of a solution of hydrogen chloride in diethyl ether containing 7% by weight of HCl. 15,15'-Dehydro-β-carotene started to crystallize out in beautiful platelets even during the refluxing operation.

Example 7

2 g. of crude 1,18-di-(2,6,6-trimethyl-1-cyclohexen-1-yl)-3,7,12,16-tetramethyl-2,4,6,12,14,16 - octadecahexaen-9-yne-8,11-diol (obtained according to Example 1) was dissolved in 50 ml. of benzene and mixed with 10 ml. of anhydrous ethanolic hydrogen chloride containing 3% by weight HCl. Upon standing overnight, 15,15'-dehydro-β-carotene crystallized in beautiful platelets in good yield.

Example 8

26 g. of crude 1,18-di-(2,6,6-trimethyl-1-cyclohexylidene)-3,7,12,16-tetramethyl - 2,4,6,12,14,16 - octadecahexaen-9-yne-8,11-diol [made by condensing 24 g. of 8-(2,6,6-trimethyl-1-cyclohexylidene)-2,6 - dimethyl - 2,4,6-octatrien-1-al with acetylene dimagnesium bromide] was dissolved in 380 ml. of methylene chloride and cooled to minus 40° C. by solid carbon dioxide. 15 ml. of glacial acetic acid was added, whereupon the temperature rose to about minus 36° C. The reaction mixture was mixed within about 20 seconds with 16 ml. of concentrated aqueous hydrobromic acid containing 60% by weight of HBr. The mixture, containing 1,18-di-(1-bromo-2,6,6-trimethyl-1-cyclohexyl)-3,7,12,16-tetramethyl - 1,3,5,7,11, 13,15,17-octadecaoctaen-9-yne, was stirred vigorously for 1½ minutes at minus 32° to minus 30° C. and was then reacted with 380 ml. of water having a temperature of 10° C. The mixture was stirred in an ice bath at 0° to minus 5° for one hour under a carbon dioxide atmosphere. The methylene chloride solution was then separated and washed thrice, each time with 100 ml. of water. The washed organic solution was concentrated, and the crystalline residue was extracted well with 75 ml. of petroleum ether (boiling range 30°–50° C.). The mixture was filtered and the filtrate was washed with petroleum ether. There was thus obtained 15.5 g. of 15,15'-dehydro-β-carotene. Upon recrystallization from methylene chloride-methanol, the compound had M.P. 154°–155° C. and showed two maxima in the ultraviolet absorption spectrum, at 431 mµ ($\epsilon$=108000) and 457 mµ ($\epsilon$=88600) in petroleum ether.

Example 9

26 g. of crude 1,18-di-(2,6,6-trimethyl-1-cyclohexylidene)-3,7,12,16 - tetramethyl - 2,4,6,12,14,16 - octadecahexaen-9-yne-8,11-diol (made according to Example 8) was dissolved in 23 ml. of methylene chloride. 9 ml. of pyridine was added, and then 4 ml. of acetyl chloride in 4.5 ml. of methylene chloride was added dropwise while maintaining the temperature below 10° C. The mixture was stirred for one hour at 5° to 10° C. and one hour at 25° C. Then the reaction mixture was poured upon ice and the methylene chloride solution was washed twice with dilute aqueous hydrochloric acid and once with water. The methylene chloride solution, containing 1,18-di-(2,6,6-trimethyl-1-cyclohexylidene) - 3,7,12,16 - tetramethyl-8,11-diacetoxy-2,4,6,12,14,16 - octadecahexaen-9-yne, was diluted by the addition of further methylene chloride to a total volume of 380 ml. and then was treated with 16 ml. of aqueous HBr solution (60% by weight HBr) as in Example 8. There was thus obtained 15.5 g. of 15,15'-dehydro-β-carotene.

Example 10

A solution of crude 1,18-di-(2,6,6-trimethyl-1-cyclohexylidene) - 3,7,12,16 - tetramethyl - 2,4,6,12,14,16-octadecahexaen-9-yne-8,11-diol in diethyl ether (obtained by condensation of 24 g. of 8-(2,6,6-trimethyl-1-cyclohexylidene)-2,6-dimethyl-2,4,6-octatrien-1-al with acetylene dimagnesium bromide in diethyl ether) was diluted by the addition of further diethyl ether to a total volume of 170 ml. The reaction mixture was mixed at room temperature with 60 ml. of anhydrous ethanolic hydrogen chloride containing 8% by weight HCl, and was then allowed to stand for 5 hours, at a temperature gradually lowered from room temperature to 0° C., with occasional stirring. The crystals which precipitated were filtered off, washed with ethanol and dried, yielding 15,15'-dehydro-β-carotene, M.P. 154°–155° C.

The diol, 1,18-di-(2,6,6-trimethyl-1-cyclohexylidene)-3,7,12,16-tetramethyl-2,4,6,12,14,16-octadecahexaen-9-yne-8,11-diol, is a novel compound, the preparation of which has not hitherto been described in any printed publication. This starting material for the process of the instant invention was prepared by the following procedure:

To 250 cc. of dry liquid ammonia was added 50 mg. of ferric nitrate, and a few minutes later, while stirring, 50 mg. of lithium. Dry air was blown into the blue solution for one minute. Then 2.05 g. of lithium was added slowly, with a wait after each addition until the blue color of the solution disappeared. Thereupon 18.75 g. of β-chlorovinyl ethyl ether was added while stirring well, and 10 minutes later 17 g. of 2,6,6-trimethyl-1-cyclohexanone was dropped in slowly. The mixture was stirred for 44 hours, then was slowly reacted with 22.5 g. of ammonium chloride, and finally the ammonia was allowed to evaporate. 400 cc. of diethyl ether was then added and the mixture was filtered. The ethereal solution was dried over sodium sulfate, concentrated, and the residue was distilled. The distillate was dissolved in 150 cc. of high boiling petroleum ether and was shaken with 5 g. of a lead-poisoned palladium catalyst in a hydrogen atmosphere at room temperature until the hydrogen uptake ceased. The catalyst was filtered off and the petroleum ether solution was shaken with 150 cc. of water and 15 cc. of 3 N aqueous HCl for 16 hours at room temperature. Thereupon the petroleum ether solution was separated, washed with dilute sodium bicarbonate solution and water, dried over sodium sulfate, and the solvent was evaporated off. Upon distillation of the residue there was obtained 2,6,6-trimethyl-1-cyclohexylidene-acetaldehyde, B.P. 102° C./11 mm.; $n_D^{23}=1.4938$.

To a solution of 110 g. of 2,6,6-trimethyl-1-cyclohexylidene-acetaldehyde in 120 ml. of ethyl orthoformate was added a solution of 2 ml. of orthophosphoric acid in 18 ml. of absolute ethanol, and the mixture was set aside for 15 hours at 20 to 25° C. Then 20 ml. of pyridine was added and the mixture was poured into a mixture of 200 g. of 5% aqueous sodium bicarbonate solution and 100 g. of ice. The product was taken up in petroleum ether, the petroleum ether solution was shaken with aqueous sodium bicarbonate solution and dried over potassium carbonate. Then the petroleum ether solution was concentrated and the concentrate was freed in vacuo, at 70° C., from excess ethyl orthoformate and ethyl formate produced by reaction. The residue consisted of 2,6,6-trimethyl-1-cyclohexylidene-acetaldehyde-diethylacetal, $n_D^{23}=1.464$.

The latter product, without further purification, was condensed with ethyl propenyl ether. To this end, 9 ml. of a 10% solution of zinc chloride in ethyl acetate was added, and then 65 ml. of ethyl propenyl ether and 43 ml. of a 10% solution of zinc chloride in ethyl acetate were added, simultaneously, over a period of 2 hours, while stirring, at 30° to 35° C.; the stirring was then continued for a further period of 20 hours at room temperature. The 4-(2,6,6-trimethyl-1-cyclohexylidene)-2-methyl-1,1,3-triethoxy-butane, $n_D^{23}=1.459$, obtained in this manner, was added to a mixture of 450 ml. of glacial acetic acid, 45 g. of sodium acetate and 22 ml. of water, and was heated for 6 hours at 95° C. in a nitrogen atmosphere. Then the mixture was cooled to 30° to 40° C., and poured into 400 g. of ice and 400 ml. of water. The oily reaction product was taken up in petroleum ether; and the petroleum ether solution was washed with 5% aqueous sodium bicarbonate solution and with water, and dried over sodium sulfate. The petroleum ether solution was concentrated, and the concentrate was distilled in a high vacuum, yielding 4-(2,6,6-trimethyl-1-cyclohexylidene)-2-methyl-2-buten-1-al, B.P.=82° to 84° C./0.05 mm. Hg; $n_D^{23}=1.547$.

To a solution of 77 g. of 4-(2,6,6-trimethyl-1-cyclohexylidene)-2-methyl-2-buten-1-al in 85 ml. of ethyl orthoformate was added a solution of 1.5 ml. of orthophosphoric acid in 15 ml. of absolute ethyl alcohol, and the mixture was set aside for 15 hours at 20° to 25° C. Thereupon 10 ml. of pyridine was added, and the mixture was poured into a mixture of 100 g. of 5% aqueous sodium bicarbonate solution and 60 g. of ice. The resulting mixture was extracted with petroleum ether, the extract was shaken with aqueous sodium bicarbonate solution and dried over potassium carbonate. The petroleum ether solution was concentrated, and the residue was freed in vacuo at 70° C. of excess ethyl orthoformate and of ethylformate produced by reaction, thereby yielding 4-(2,6,6-trimethyl-1-cyclohexylidene)-2-methyl-1,1-diethoxy-2-butene; $n_D^{22}=1.5155$.

The latter product, without further purification, was condensed with ethyl vinyl ether. To this end, 5 ml. of a 10% solution of zinc chloride in ethyl acetate was added to 102 g. of the product of $n_D^{22}=1.5155$ above referred to, then 29 g. of ethyl vinyl ether and 25 ml. of a 10% solution of zinc chloride in ethyl acetate were added, simultaneously, while stirring, at 25° to 35° C., over a period of 2 hours. The stirring was continued 15 hours longer, at room temperature. The product was taken up in petroleum ether, washed with dilute sodium hydroxide solution, and dried over potassium carbonate; then the solvent was distilled off.

To the crude 6-(2,6,6-trimethyl-1-cyclohexylidene)-4-methyl-1,1,3-triethoxy-4-hexene (132 g.) obtained in this manner was added a mixture of 300 ml. of glacial acetic acid, 30 g. of sodium acetate and 15 ml. of water, and a trace of hydroquinone. The mixture was heated for 6 hours in a nitrogen atmosphere at 95° C. Then it was cooled to 30° to 40° C. and poured into a mixture of 250 g. of ice and 250 ml. of water. The oily reaction product was extracted with petroleum ether, the extract was washed with 5% aqueous sodium bicarbonate solution and with water, and dried over sodium sulfate. After concentration of the petroleum ether solution, the residue was distilled in a high vacuum. There was obtained 6-(2,6,6-trimethyl-1-cyclohexylidene)-4-methyl-2,4-hexadien-1-al, B.P. 120°–130° C./0.07 mm. Hg. By crystallization from petroleum ether at minus 70° C., there was obtained a crystalline form, M.P. 61–62° C.

To a solution of 26.5 g. of 6-(2,6,6-trimethyl-1-cyclohexylidene)-4-methyl-2,4-hexadien-1-al, in 28 ml. of ethyl orthoformate, was added a solution of 0.4 ml. by volume of orthophosphoric acid in 7 ml. of absolute ethyl alcohol, and the mixture was set aside for 15 hours at 20° to 25° C. Then 10 ml. of pyridine was added and the mixture was poured into a mixture of 100 g. of 5% aqueous sodium bicarbonate solution and 60 g. of ice. The resulting mixture was extracted with petroleum ether, the extract was shaken with aqueous sodium bicarbonate solution and dried over potassium carbonate. The petroleum ether solution was concentrated, and the residue was freed from excess ethyl orthoformate and ethyl formate produced by reaction, in vacuo at 70° C. The residue consisted of 32.7 g. of 6-(2,6,6-trimethyl-1-cyclohexylidene)-4-methyl-1,1-diethoxy-2,4-hexadiene, $n_D^{23}=1.522$.

The latter product, without further purification, was condensed with ethyl propenyl ether; by adding 1 ml. of a 10% solution of zinc chloride in ethyl acetate to 32.7 g. of the product of $n_D^{23}=1.522$ above referred to, then adding simultaneously, while stirring, at 30° to 35° C. and over a period of 2 hours, 10 g. of ethyl propenyl ether and 9 ml. of a 10% solution of zinc chloride in ethyl acetate; followed by stirring for an additional period of 20 hours at room temperature. The crude 8-(2,6,6-trimethyl-1-cyclohexylidene)-2,6-dimethyl-1,1,3-triethoxy-4,6-octadiene obtained in this manner was added to a mixture of 100 ml. of glacial acetic acid, 10 g. of sodium acetate and 5 ml. of water. The mixture was heated for 6 hours at 95° C. in a nitrogen atmosphere, then cooled to 30° to 40° C. and poured into a mixture of 200 g. of ice and 200 ml. of water. The oily reaction product was extracted with petroleum ether; the extract was washed with 5% aqueous sodium bicarbonate solution, then with water, and finally was dried over sodium sulfate. The petroleum ether solution was concentrated, and the residue was distilled in a high vacuum. There was obtained 8-(2,6,6-trimethyl-1-cyclohexylidene)-2,6-dimethyl - 2,4,6-octatrien-1-al, B.P.=140°–150° C./0.05 mm. Hg.

1 g. of magnesium and 6.6 g. of n-hexyl bromide were reacted in 20 ml. of absolute diethyl ether, thereby forming an ethereal solution of n-hexyl magnesium bromide. This Grignard solution was stirred for 24 hours in an atmosphere of acetylene. Two layers were formed. The upper layer was separated off. The lower layer was washed once with 8 ml. of absolute diethyl ether, and to the washed material was added 12 ml. of absolute diethyl ether, and then a solution of 4.8 g. of 8-(2,6,6-trimethyl-1-cyclohexylidene)-2,6-dimethyl-2,4,6-octatrien-1-al in 12 ml. of absolute diethyl ether was added quickly. The mixture was refluxed for 3 hours, while stirring, in a nitrogen atmosphere. Then the reaction mixture was cooled, poured into a mixture of 15 ml. of 3 N sulfuric acid and 20 g. of ice, and the whole was stirred well for 5 minutes. The ether layer was separated and washed with water, then with 5% aqueous sodium bicarbonate solution, and then the washed ethereal solution was dried over sodium sulfate. The ether was driven off, yielding 1,18-di-(2,6,6-trimethyl - 1 - cyclohexylidene) - 3,7,12,16-tetramethyl-2,4,6,12,14,16-octadecahexaen - 9 - yne - 8,11-diol, having absorption maxima in the ultraviolet spectrum at 310 m$\mu$, 324 m$\mu$ and 339 m$\mu$ (in petroleum ether). Determination of active hydrogen according to Zerewitinoff showed two active hydrogen atoms.

We claim:

1. A process for the preparation of 15,15'-dehydro-$\beta$-carotene which comprises subjecting a compound selected from the group consisting of 1,18-di-(2,6,6-trimethyl-1-cyclohexen-1-yl)-3,7,12,16 - tetramethyl - 2,4,6,12,14,16-octadecahexaen-9-yne-8,11-diol and lower alkanoic acid diesters thereof and 1,18-di-(2,6,6-trimethyl-1-cyclohexylidene)-3,7,12,16-tetramethyl - 2,4,6,12,14,16 - octadecahexaen-9-yne-8,11-diol and lower alkanoic acid diesters thereof to allyl rearrangement-dehydration by the action of a hydrohalic acid.

2. A process for the preparation of 15,15'-dehydro-$\beta$-carotene which comprises reacting a compound selected from the group consisting of 1,18-di-(2,6,6-trimethyl-1-cyclohexen-1-yl)-3,7,12,16 - tetramethyl - 2,4,6,12,14,16-octadecahexaen-9-yne-8,11-diol and lower alkanoic acid diesters thereof and 1,18-di-(2,6,6-trimethyl-1-cyclohexylidene)-3,7,12,16 - tetramethyl - 2,4,6,12,14,16-octadecahexaen-9-yne-8,11-diol and lower alkanoic acid diesters thereof with a hydrohalic acid selected from the group consisting of hydrochloric acid and hydrobromic acid at a temperature below about 30° C.

3. A process according to claim 2 in which the hydrohalic acid is anhydrous.

4. In a process in which 15,15'-dehydro-$\beta$-carotene is made by condensing acetylene with 8-(2,6,6-trimethyl-1-cyclohexen-1-yl)-2,6-dimethyl-2,4,6-octatrien-1-al in a di-(lower alkyl) ether medium and subjecting the resulting 1,18-di-(2,6,6-trimethyl-1-cyclohexen - 1 - yl) - 3,7,12,16-tetramethyl-2,4,6,12,14,16-octadecahexaen - 9 - yne - 8,11-diol to allyl rearrangement-dehydration, the improvement which comprises treating 1,18-di-(2,6,6-trimethyl-1-cyclohexen-1-yl)-3,7,12,16 - tetramethyl - 2,4,6,12,14,16 - octadecahexaen-9-yne-8,11-diol, without isolation thereof but in said ether medium, with an anhydrous hydrogen halide selected from the group consisting of hydrogen chloride and hydrogen bromide.

5. A process for the preparation of 15,15'-dehydro-$\beta$-carotene which comprises subjecting a solution of 1,18-di-(2,6,6-trimethyl-1-cyclohexen-1 - yl) - 3,7,12,16 - tetramethyl-2,4,6,12,14,16-octadecahexaen-9-yne-8,11-diol in a lower alkyl alkanoate to the action of an anhydrous alcoholic solution of a hydrogen halide selected from the group consisting of hydrogen chloride and hydrogen bromide.

6. A process for the preparation of 15,15'-dehydro-$\beta$-carotene which comprises subjecting a solution of 1,18-di-(2,6,6-trimethyl-1-cyclohexen - 1 - yl) - 3,7,12,16-tetramethyl-2,4,6,12,14,16-octadecahexaen-9-yne - 8,11-diol to the action of an aqueous solution of a hydrogen halide selected from the group consisting of hydrogen chloride and hydrogen bromide.

References Cited in the file of this patent

UNITED STATES PATENTS

| | | |
|---|---|---|
| 2,369,163 | Milas | Feb. 13, 1945 |
| 2,434,981 | Bludworth et al. | Jan. 27, 1948 |
| 2,449,956 | Shokal et al. | Sept. 21, 1948 |
| 2,564,534 | Johnson et al. | Aug. 14, 1951 |
| 2,626,921 | Eberly et al. | Jan. 27, 1953 |
| 2,671,112 | Inhoffen et al. | Mar. 2, 1954 |
| 2,806,885 | Isler et al. | Sept. 17, 1957 |

OTHER REFERENCES

Morton: "Chemistry and Industry," May 4, 1940, pages 301–307.

Henbest et al.: "Journal of the Chemical Society of London," August 1955, pages 2763–2765.